(12) United States Patent
Khawand et al.

(10) Patent No.: US 9,269,146 B2
(45) Date of Patent: Feb. 23, 2016

(54) TARGET OBJECT ANGLE DETERMINATION USING MULTIPLE CAMERAS

(75) Inventors: Charbel Khawand, Sammamish, WA (US); Chanwoo Kim, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 585 days.

(21) Appl. No.: 13/592,890

(22) Filed: Aug. 23, 2012

(65) Prior Publication Data
US 2014/0056470 A1 Feb. 27, 2014

(51) Int. Cl.
*G06T 7/00* (2006.01)

(52) U.S. Cl.
CPC ....... *G06T 7/004* (2013.01); *G06T 2207/10012* (2013.01)

(58) Field of Classification Search
None
See application file for complete search history.

(56) References Cited

U.S. PATENT DOCUMENTS

| | | | |
|---|---|---|---|
| 5,940,118 A | 8/1999 | Van Schyndel | |
| 6,597,806 B1* | 7/2003 | Kawada | 382/151 |
| 6,845,164 B2 | 1/2005 | Gustafsson | |
| 2002/0097885 A1 | 7/2002 | Birchfield et al. | |
| 2004/0001137 A1 | 1/2004 | Cutler et al. | |
| 2005/0008169 A1 | 1/2005 | Muren et al. | |
| 2008/0218582 A1 | 9/2008 | Buckler | |
| 2009/0046139 A1 | 2/2009 | Cutler et al. | |
| 2009/0052740 A1 | 2/2009 | Sonoura | |
| 2009/0055170 A1 | 2/2009 | Nagahama | |
| 2009/0066798 A1* | 3/2009 | Oku et al. | 348/207.99 |
| 2009/0080876 A1* | 3/2009 | Brusnitsyn et al. | 396/128 |
| 2010/0026780 A1 | 2/2010 | Tico et al. | |
| 2010/0070274 A1 | 3/2010 | Cho et al. | |
| 2010/0082340 A1 | 4/2010 | Nakadai et al. | |
| 2011/0015924 A1 | 1/2011 | Gunel Hacihabiboglu et al. | |
| 2011/0018862 A1* | 1/2011 | Epps | 345/419 |
| 2011/0115945 A1* | 5/2011 | Takano et al. | 348/231.99 |
| 2011/0221869 A1* | 9/2011 | Yamaya et al. | 348/47 |
| 2012/0062702 A1* | 3/2012 | Jiang et al. | 348/46 |
| 2012/0327194 A1* | 12/2012 | Shiratori et al. | 348/47 |
| 2013/0050069 A1* | 2/2013 | Ota | 345/156 |

(Continued)

FOREIGN PATENT DOCUMENTS

WO WO 96/22537 7/1996

OTHER PUBLICATIONS

International Search Report and Written Opinion from International Application No. PCT/US2013/055231, dated Nov. 4, 2013, 12 pp.

(Continued)

*Primary Examiner* — Michelle Entezari
(74) *Attorney, Agent, or Firm* — Timothy Churna; Judy Yee; Micky Minhas

(57) ABSTRACT

Systems, methods, and computer media for determining the angle of a target object with respect to a device are provided herein. Target object information captured at approximately the same time by at least two cameras can be received. The target object information can comprise images or distances from the target object to the corresponding camera. An angle between the target object and the device can be determined based on the target object information. When the target object information includes images, the angle can be determined based on a correlation between two images. When the target object information includes distances from the target object to the corresponding camera, the angle can be calculated geometrically.

20 Claims, 8 Drawing Sheets

(56) References Cited

U.S. PATENT DOCUMENTS

2013/0151135 A1* 6/2013 Aubrey et al. ............... 701/118
2013/0338962 A1* 12/2013 Crandall ...................... 702/142

OTHER PUBLICATIONS

Nakadai et al., "Real-Time Speaker Localization and Speech Separation by Audio-Visual Integration," *Proceedings 2002 IEEE International Conference on Robotics and Automation*, 1: 1043-1049 (2002).

Wang et al, "Image and Video Based Remote Target Localization and Tracking on Smartphones," *Geospatial Infofusion II, SPIE*, 8396(1): 1-9 (May 11, 2012).

Asano, et al., "Fusion of Audio and Video Information for Detecting Speech Events", In Proceedings of the Sixth International Conference of Information Fusion, vol. 1, Jul. 8, 2003, pp. 386-393.

P. Arabi and G. Shi, "Phase-Based Dual-Microphone Robust Speech Enhancement," IEEE Tran. Systems, Man, and Cybernetics—Part B: Cybernetics, 34(4):pp. 1763-1773, (Aug. 2004).

J. Allen and D. Berkley, "Image method for efficiently simulating small-room acoustics," J. Acoust. Soc. Am., 65(4):pp. 943-950, (Apr. 1979).

Attias, "New EM Algorithms for Source Separation and Deconvolution with a Microphone Array," Microsoft Research, 4 pages.

Attias et al., "Speech Denoising and Dereverberation Using Probabilistic Models," Advances in Neural Information Processing Systems (NIPS), 13: pp. 758-764, (Dec. 3, 2001).

W. Grantham, "Spatial Hearing and Related Phenomena," Hearing, Academic Press, pp. 297-345 (1995).

Kim et al, "Signal Separation for Robust Speech Recognition Based on Phase Difference Information Obtained in the Frequency Domain," Interspeech, pp. 2495-2498 (Sep. 2009).

Kim et al., "Binaural Sound Source Separation Motivated by Auditory Processing," IEEE Int. Conf. on Acoustics, Speech, and Signal Processing, pp. 5072-5075 (May 2011).

Kim et al., Two-microphone source separation algorithm based on statistical modeling of angle distributions, in IEEE. Conf. Acoust, Speech, and Signal Processing, 4 pages, (Mar. 2012 accepted).

C. Kim and R. M. Stern, "Power-Normalized Cepstral Coefficients (PNCC) for Robust Speech Recognition," IEEE Trans. Audio, Speech, Lang. Process., (in submission).

S. G. McGovern, "A Model for Room Acoustics," http://2pi.us/rir.html.

H. Park, and R. M. Stern, "Spatial separation of speech signals using amplitude estimation based on interaural comparisons of zero crossings," Speech Communication, 51(1):pp. 15-25, (Jan. 2009).

Lucas Parra and Clay Spence, "Convolutive Blind Separation of Non-Stationary Sources," IEEE transactions on speech and audio processing, 8(3):pp. 320-327, (May 2005).

Roweis, "One Microphone Source Separation," http://www.ece.uvic.ca/~bctill/papers/singchan/onemic.pdf, pp. 793-799 (Apr. 3, 2012).

Srinivasan et al, "Binary and ratio time-frequency masks for robust speech recognition," Speech Comm., 48:pp. 1486-1501, (2006).

Wang et al., "Video Assisted Speech Source Separation," IEEE International Conference on Acoustics, Speech, and Signal Processing, pp. 425-428 (Mar. 18, 2005).

Weiss, "Underdetermined Source Separation Using Speaker Subspace Models," http://www.ee.columbia.edu/~ronw/pubs/ronw-thesis.pdf, 134 pages, (Retrieved: Apr. 3, 2012).

Non-Final Office Action, U.S. Appl. No. 13/569,092, 8 pages, Apr. 14, 2015.

Notice of Allowance, U.S. Appl. No. 13/569,092, 13 pages, May 8, 2015.

* cited by examiner

TARGET OBJECT ANGLE DETERMINATION USING MULTIPLE CAMERAS

FIELD

The present application relates generally to visual object detection.

BACKGROUND

Computing device capabilities have advanced dramatically in recent years. Mobile devices in particular have experienced tremendous gains in processing power, enabling, among other things, advanced audio and video recording capabilities. Many capabilities, including audio and video recording capabilities, can benefit from identification of a target. The target may be a source of desired audio, a desired video subject, or be otherwise of interest to a user.

Mobile devices and other consumer devices are often used in noisy environments with a variety of audio sources, background noises, and objects in the visual display. Separating extraneous information from information related to the target can provide higher quality information to the user. For example, in audio noise reduction, source separation algorithms have been developed to distinguish the portion of received audio that originates from a target from other sources. Audio and video recording capabilities that attempt to distinguish target information from other sources typically assume that the target is directly in front of and perpendicular to the device. Practically, however, both targets and devices acquiring information about targets often move during acquisition, shifting the actual focus away from the intended target.

SUMMARY

Embodiments described herein relate to determining the angle of a target object with respect to a device having at least two cameras. Using the systems, methods, and computer media described herein, an angle of a target object with respect to a device can be determined. First target object information captured using a first camera on the device and second target object information captured using a second camera on the device can be received. The first target object information and the second target object information are captured at approximately a same capture time. Based on the first and second target object information captured by the cameras, an angle between the target object and the device can be determined.

In some embodiments, the first target object information is a first image and the second target object information is a second image. A correlation value for a correlation between the first and second images can be determined, and the angle can be determined based on the correlation value. For example, a tuning table having correlation values and corresponding angles can be accessed, and the angle corresponding to the correlation value closest to the determined correlation value can be retrieved. In other embodiments, the first target object information and the second target object information are estimated distances from the target object to the corresponding camera on the device. The estimated distance can be acquired, for example, using an autofocus function of the first and second cameras.

In some embodiments, the determined angle may be provided to a microphone audio source separation algorithm to identify an audio signal produced by the target object and remove noise.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

DETAILED DESCRIPTION

Embodiments described herein provide systems, methods, and computer media for determining the angle of a target object with respect to a device. In accordance with some embodiments, at least two cameras on the device can be used to gather information about the target object. The information gathered by the two cameras can be used to determine the angle between the target object and the device. In one example, the target object information gathered by the two cameras is images. An angle can be determined based on a correlation between the images. In another example, the target object information can be distances between the target object and the cameras. Distance between each camera and the target object can be determined using an autofocus function, and the angle can be determined through geometric calculation.

The angle between the target object and the device can be used for a variety of purposes. Knowing the location of the target object with respect to the device can be especially useful for audio and video applications. In such applications, separating extraneous information from information related to the target object can improve the quality of information provided to a user. For example, the angle can be provided to a microphone audio source separation algorithm to enhance identification of an audio signal produced by the target object and remove noise. Embodiments are described in detail below with reference to FIGS. 1-8.

Figure 1:
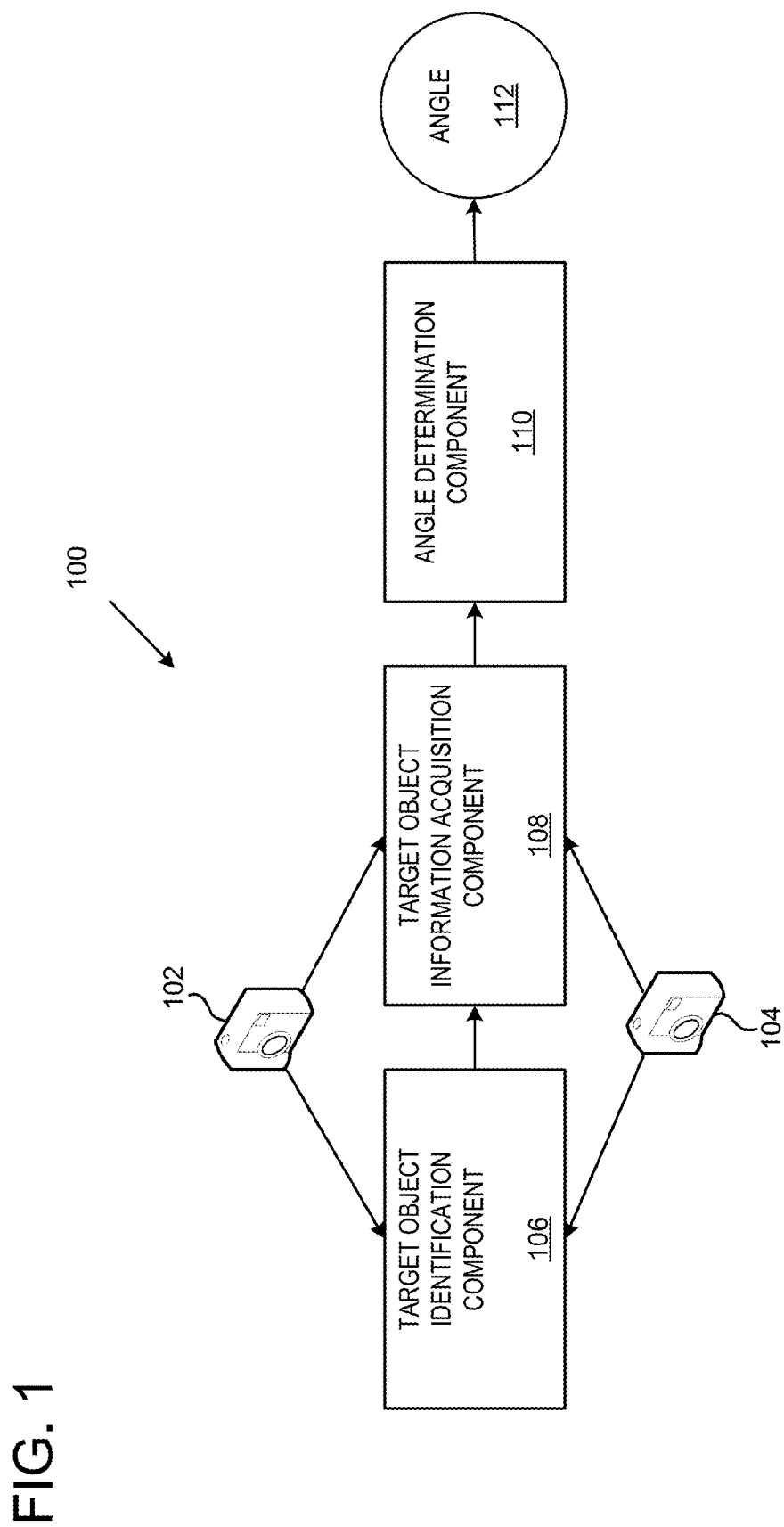
FIG. 1 is a block diagram of an exemplary target object angle determination system.

FIG. 1 illustrates an exemplary target object angle determination system 100. Cameras 102 and 104 capture images of the surrounding environment. Cameras 102 and 104 may be integrated into a device or may be external to but in wired or wireless communication with the device. In one example, the device is a mobile device such as a smartphone, and cameras 102 and 104 are integrated into the mobile device.

Target object identification component 106 receives an identification of an object as the target object. In some embodiments, a portion of the surrounding environment viewable by cameras 102 and 104 is visible on a display of the device. The display can be, for example, a touchscreen display of a mobile device or a conventional monitor or other display. The identification of the object received by target object identification component 106 can be a user or other selection of an object visible on a display of the device. The target object can be any object at least partially visible by at least one of camera 102 and 104. The target object can be a source of audio, a desired video subject, or other object. Exemplary target objects include a person, animal, or object that is speaking, moving, or performing. Other target objects are also contemplated.

Target object information acquisition component 108 receives target object information captured by cameras 102 and 104. The target object information captured by camera 102 and the target object information captured by camera 104 are captured approximately simultaneously. Capturing target information at cameras 102 and 104 near together in time provides an accurate description of the target object's location by providing the location with respect to two different reference points (cameras 102 and 104). The meaning of "approximately simultaneously" may be different depending on whether the device or the target object are moving. For example, if either the target object or the device is moving, target object information acquired closer to simultaneously can more accurately describe the target object's position.

In some embodiments, the target object information comprises images. In other embodiments, the target object information comprises estimated distances from the target object to cameras 102 and 104.

Figure 2:
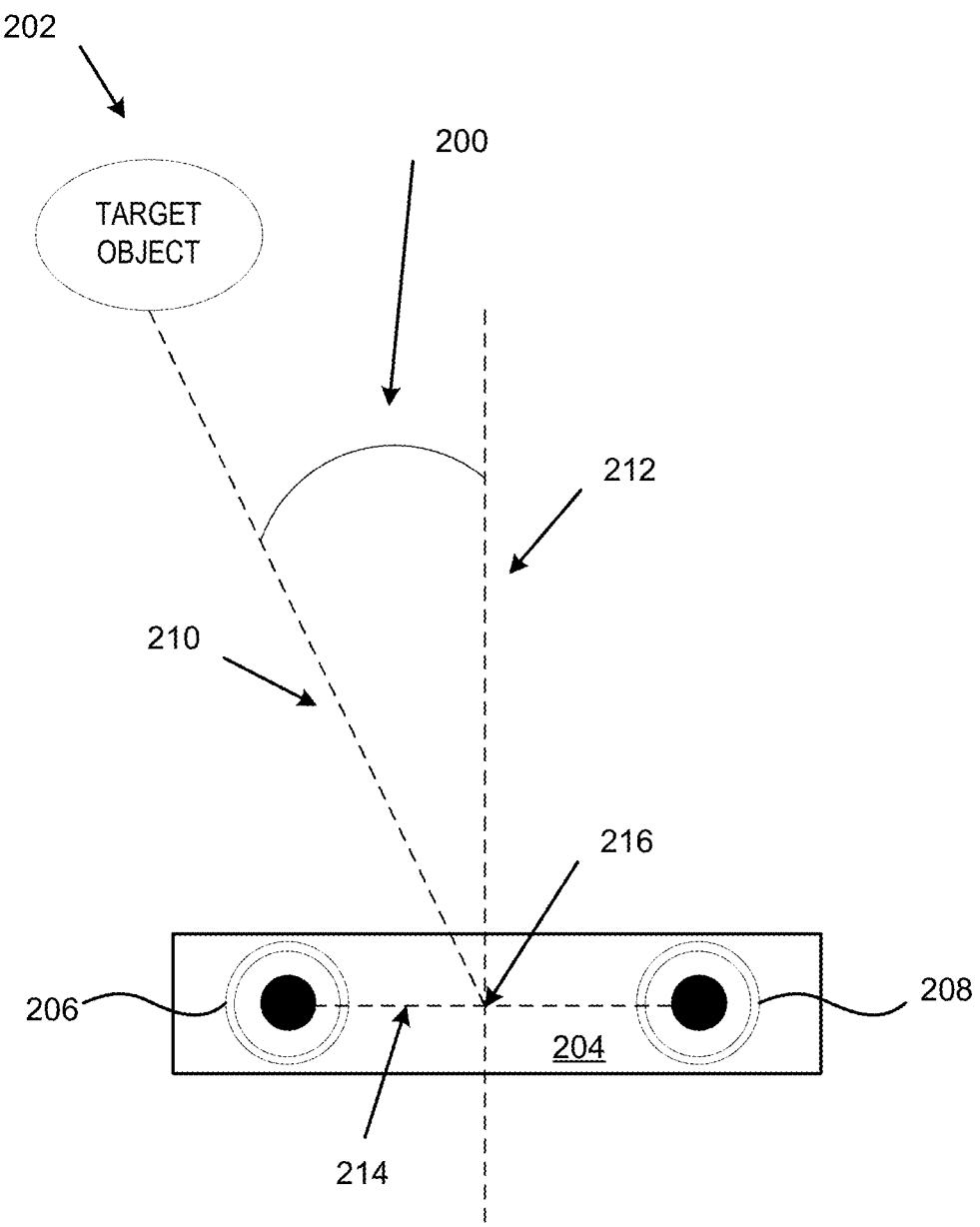
FIG. 2 is a block diagram illustrating an exemplary angle between a first reference line extending from a target object to a device and a second reference line extending through the device.

Angle determination component 110 determines an angle 112 between the target object and the device. Angle 112 is determined using the target object information. FIG. 2 illustrates exemplary reference lines and an exemplary angle. In FIG. 2, an angle 200 is shown between a target object 202 and a device 204 having two cameras 206 and 208. Angle 200 is the angle between first reference line 210 and second reference line 212. First reference line 210 extends between target object 202 and device 204, and second reference line 212 extends through device 204. In this example, second reference line 212 is perpendicular to a third reference line 214 that extends between camera 206 and camera 208. First reference line 210 and second reference line 212 intersect at the approximate midpoint 216 of third reference line 214. In other embodiments, the reference lines, points of intersection of reference lines, and angles are different.

Figure 3:
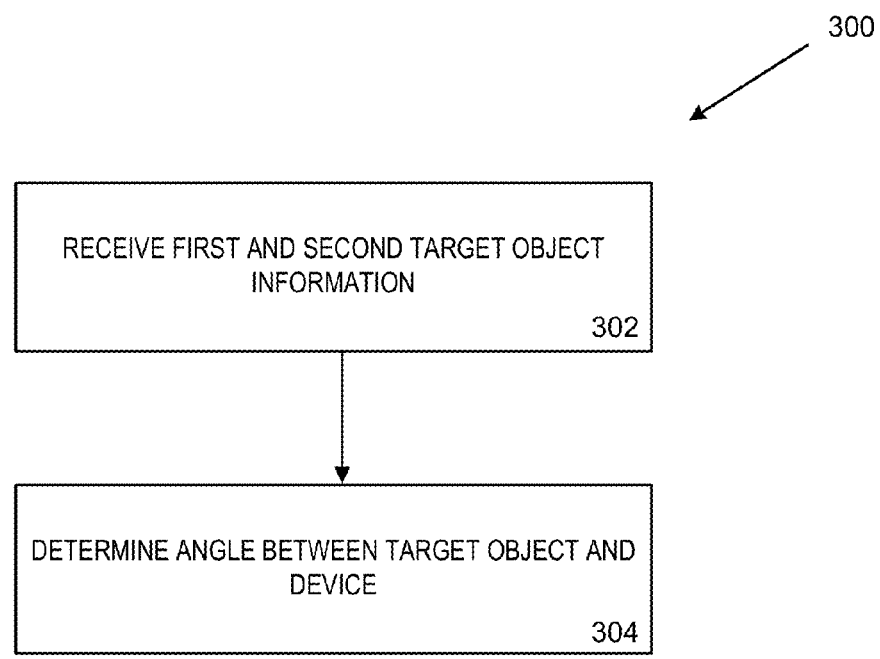
FIG. 3 is a flowchart of an exemplary method of determining an angle of a target object with respect to a device.

FIG. 3 illustrates a method 300 of determining an angle of a target object with respect to a device. In process block 302, first target object information captured using a first camera on the device and second target object information captured using a second camera on the device are received. The first and second target object information are captured at approximately a same capture time. An angle between the target object and the device is determined in process block 304 based on the first and second target object information.

The angle and first and second reference lines can be, for example, those illustrated in FIG. 2. In such an example, determining the angle between the target object and the device comprises determining an angle between a first reference line extending from the target object to the device and a second reference line extending through the device. The second reference line is substantially perpendicular to a third reference line extending between the first and second cameras, and the first reference line and the second reference line intersect at the approximate midpoint of the third reference line.

In some embodiments, the user can select which object is identified as the target object. For example, a user selection of a first object visible on a display of the device can be received, and the first object can be identified as the target object in response to the user selection of the first object. In one embodiment, the display is a touchscreen display, and the user selection is a user touch selection of the first object on the touchscreen display. In some embodiments, the user can switch target objects by selecting a second object. For example, a user selection of a second object visible on the display of the device can be received, and the target object can be updated from the first object to the second object in response to the user selection of the second object. In this way, for example, a user recording a first person in a conversation could change the target object from the first person to a second person by making a touch selection of the second person on the device's touchscreen display to focus on the second person's contribution to the conversation.

In other embodiments, the target object is selected automatically as the object that is located closest to the center of the device display. Such an automatic selection of the central object is the default mode in some embodiments. In still further embodiments, the target object is selected automatically as the object located in a specified section of the display. For example, a user can specify that the target object is the object centered or most prominent in the upper-right-hand corner of the device display.

In some embodiments, the target object can be a group of objects. For example, user selections of a plurality of objects visible on a display of the device can be received, and the plurality of objects can be identified as the target object in response to the user selections. This allows each member of a band or each participant in a conversation, for example, to be included as part of a single target object. When a group of objects is identified as the target object, various approaches may be used to determine the angle. In one embodiment, an angle is determined for each or two or more of the plurality of objects, and a representative angle is determined for the target object based on the individual angles. The representative angle can be the average angle. In another example, a user can assign an importance to each of the objects in the group, and the representative angle can be a weighted average based on the importance of each object. Other representative angles are also contemplated.

In many situations, if a target object is a person or animal or is otherwise capable of movement, the target object may move during audio recording, video recording, or other functionality that is focusing on the target object. Method 300 can also include target object tracking. For example, the target object information received in process block 302 is captured at approximately a first time, and additional target object information captured at approximately a second time is also received. The target object is tracked by determining an updated angle between the target object and the device based on the additional target object information. Tracking can be automatically performed at designated time intervals or can be manually updated by the user. The designated time interval can be automatically selected or can be selected by the user.

Figure 4:
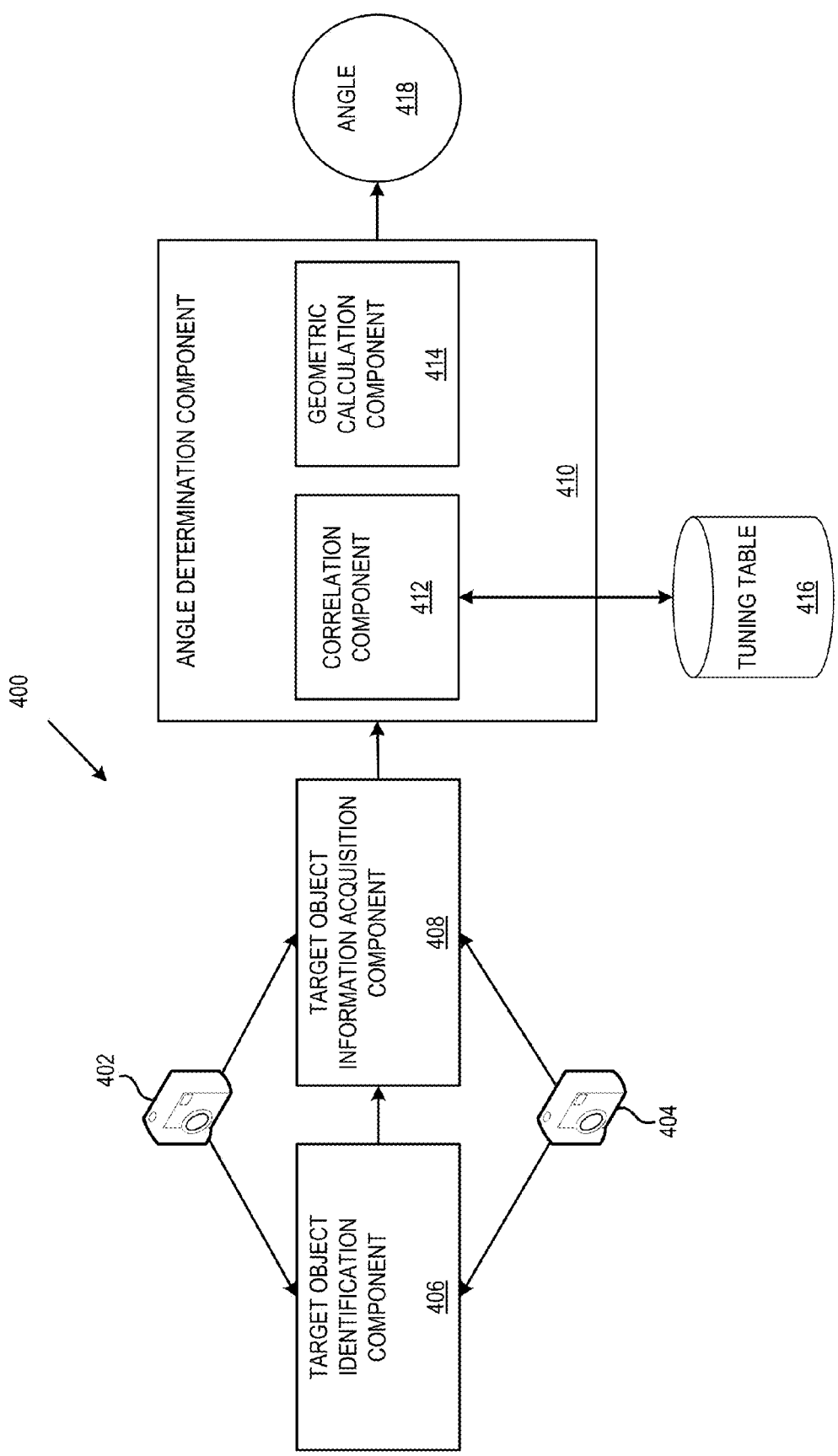
FIG. 4 is a block diagram of an exemplary target object angle determination system including exemplary angle determination components.

FIG. 4 illustrates a target object angle determination system 400. Cameras 402 and 404, target object identification component 406, and target object information acquisition component 408 are similar to the corresponding components discussed in FIG. 1. In system 400, however, angle determination component 412 comprises correlation component 410 and geometric calculation component 414. When the target object information comprises images, correlation component 412 determines a correlation value for a correlation between the images. Correlation component 412 determines the angle by accessing a tuning table 416 having correlation values and corresponding angles and retrieving the angle corresponding to the correlation value closest to the determined correlation value.

The correlation between two images indicates how alike the images are. With reference now to FIG. 2, the closer target object 202 is to reference line 212 (centered between cameras 206 and 208) the higher the correlation will be between an image captured at a capture time by camera 206 and an image captured at the same capture time by camera 208. When target object 202 is either left or right of reference line 212, however, the images are less correlated because target object 202 is "more left" or "more right" with respect to one of the cameras than with respect to the other. This is because camera 206 and 208 are in different physical positions.

For example, assume two pairs of images are captured by cameras 206 and 208, each pair having one image from camera 206 and one image from camera 208, and the images in each pair being captured approximately simultaneously. Assume that the first pair is captured when target object 202 is intersected by reference line 212, and the second pair is captured when target object 202 is intersected by reference line 210. As discussed above, the correlation between the images in the first pair is high. In some examples, correlation is measured on a scale from 0 to 1, with 1 being a perfect correlation (identical images). Using such a measurement scale, the correlation between the images of the first pair is close to 1.

Consider the situation, however, in which target object 202 were instead intersected by reference line 210. Target object 202 is now "left" as compared to its position for the first pair of images. Cameras 206 and 208 perceive target object 202's position slightly differently because of their different physical position. Camera 206, being on the left side, does not perceive that target object 202 is as "left" as camera 208 does. As a result, the images in the second pair have diverged as compared to the first pair and are less correlated. Thus, the greater angle 200 becomes, the smaller the correlation between images taken at approximately the same time at cameras 206 and 208.

Various ways of determining correlation are known in the art. Specific correlation values for various angles can be determined empirically by capturing image pairs at known angles and determining correlation values for the image pairs. These empirically determined values can be stored in a tuning table such as tuning table 416 in FIG. 4. Tuning table 416 may be device specific. In other embodiments, tuning table 416 may be based on the distance between cameras and extrapolated to apply to a variety of devices. Tuning table 416 may have a variety of formats including a spreadsheet, database, list, or other format. In one example, tuning table 416 is a list of correlation values from 0 to 1, each correlation value having a corresponding angle. In some embodiments, tuning table 416 is adaptively updated.

When the target object information comprises estimated distances from the target object to the corresponding camera on the device, geometric calculation component 414 determines the angle through geometric calculation. The distances can be obtained, for example, through an autofocus function, which can involve distance estimation. In some embodiments, the estimated distances are acquired approximately simultaneously.

Figure 5:
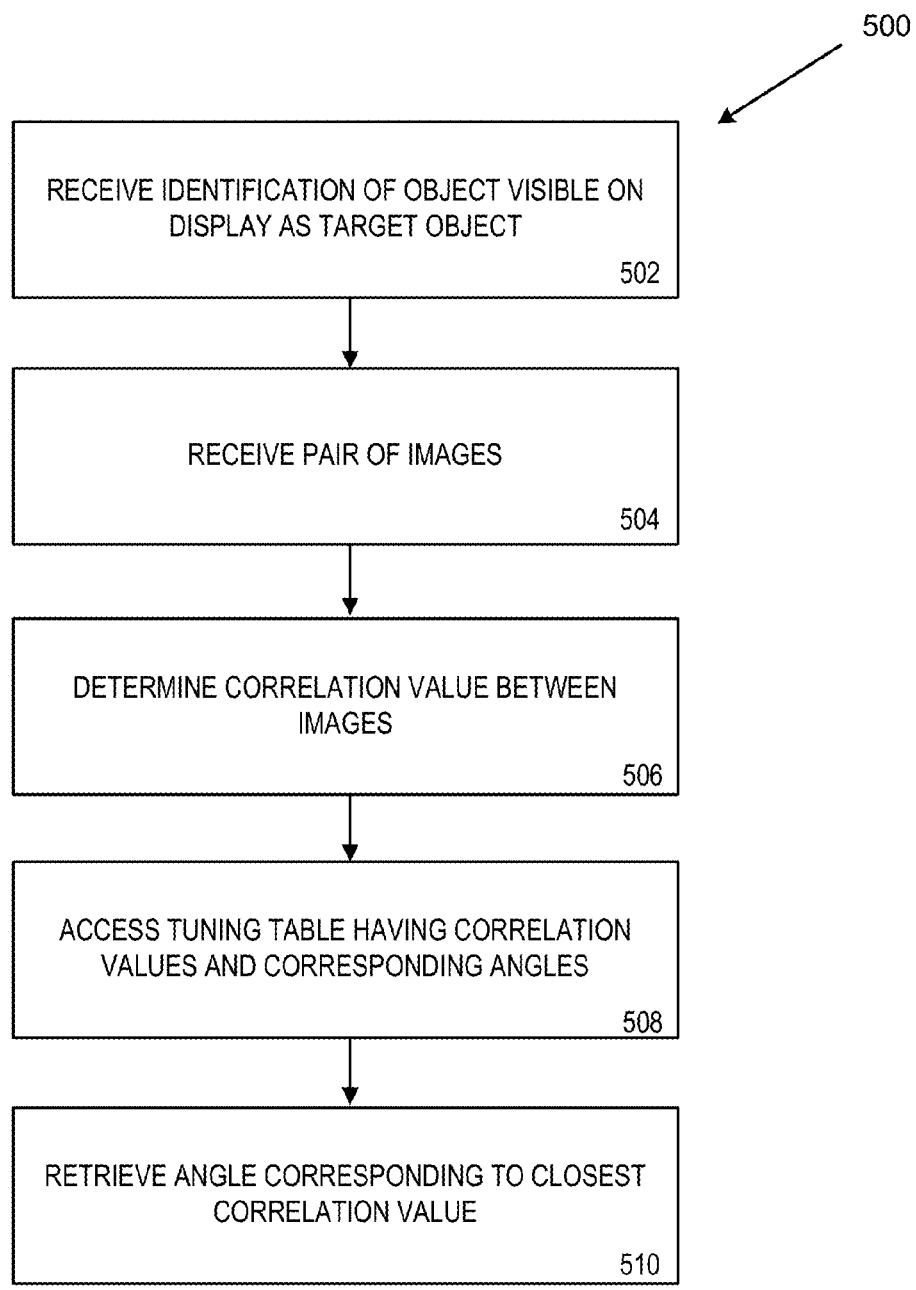
FIG. 5 is a flowchart of an exemplary method of determining an angle of a target object with respect to a device based on a correlation between two images.

FIG. 5 is a flowchart of a method 500 of determining an angle of a target object with respect to a device based on a correlation between two images. In process block 502, an identification of an object visible on a display of the device as the target object is received. A pair of images is received in process block 504. The pair of images includes at least a portion of the target object. The first pair of images comprises a first image captured by a first camera on the device and a second image captured by a second camera on the device.

In process block 506, a correlation value for a correlation between the first and second images is determined. An angle between a first reference line extending from the target object to the device and a second reference line extending through the device is determined through process blocks 508 and 510. In process block 508, a tuning table having correlation values and corresponding angles is accessed. The angle corresponding to the correlation value closest to the determined correlation value is retrieved in process block 510.

In some embodiments, the angle retrieved in process block 510 is provided to a microphone audio source separation algorithm. In other embodiments, the identification of the target object received in process block 502 is one of a user selection of the target object from the device display or an identification based on the target object being located in a specified section of the display.

Figure 6:
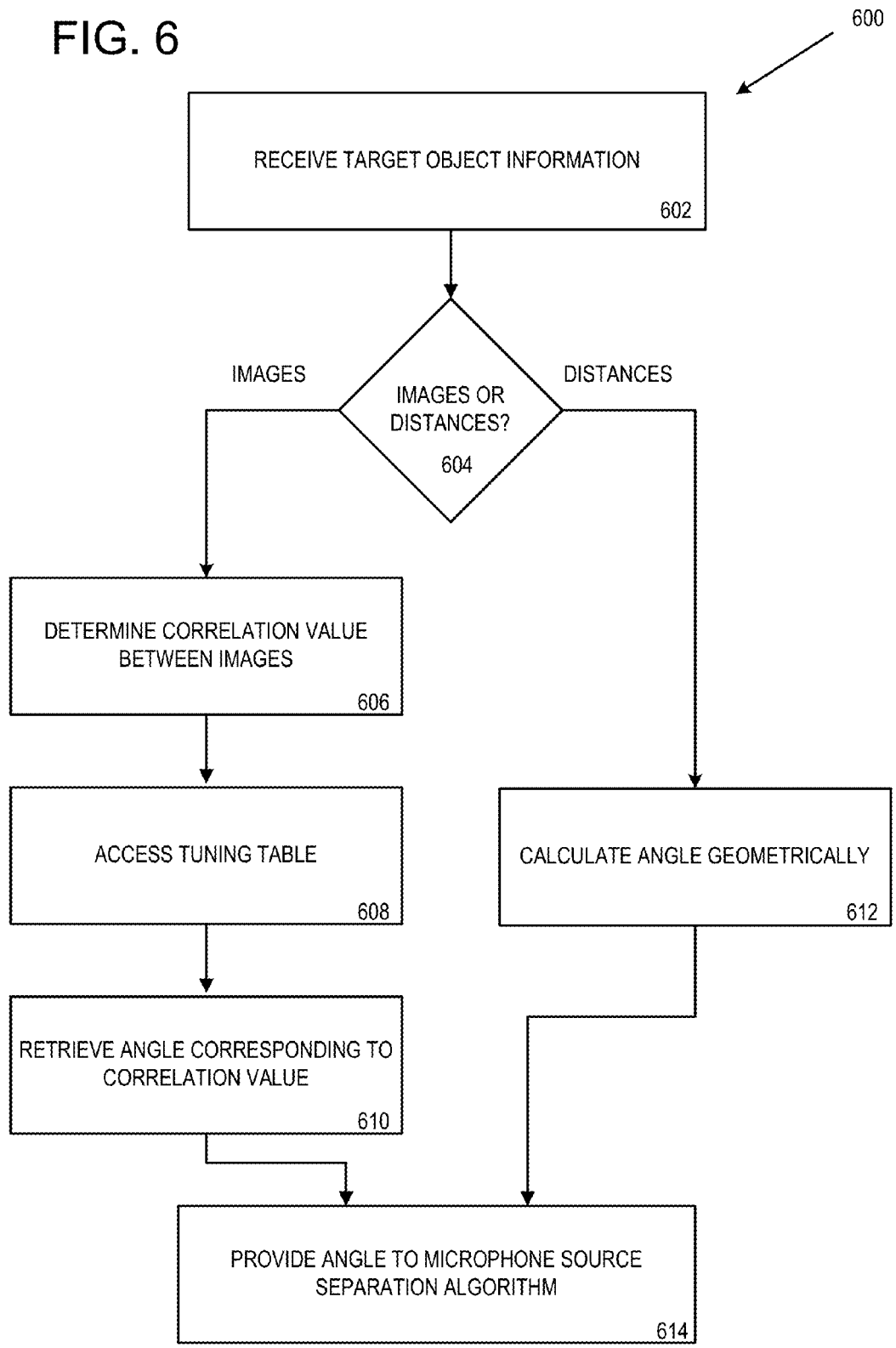
FIG. 6 is a flowchart of an exemplary method of determining an angle of a target object with respect to a device based on image correlation or distances.

FIG. 6 is a flowchart of an exemplary method 600 of determining an angle of a target object with respect to a device based on image correlation or distances. In process block 602, first target object information captured using a first camera on the device and second target object information captured using a second camera on the device are received. In process block 604, a determination is made as to whether the target object information includes images, distances, or both. If the target object information includes images, a correlation value between two images is determined in process block 606. In process block 608, a tuning table having correlation values and corresponding angles is accessed. In process block 610, the angle corresponding to the correlation value closest to the determined correlation value is retrieved and is identified as the determined angle. In some embodiments, the angle is then provided to a microphone source separation algorithm in process block 614.

If the target object information includes distances, the angle is calculated geometrically in process block 612. In some embodiments, the calculated angle is then provided to a microphone source separation algorithm in process block 614. In some embodiments, both images and distances are received in process block 602. In such embodiments, an angle can be determined both through image correlation and geometric calculation. The angle provided to the microphone source separation algorithm in process block 614 (or provided to another process) can be, for example, an average of the two angles, a weighted average, or the angle determined with a higher confidence. In one embodiment, the angle provided is the angle determined through correlation unless that angle is either unavailable or determined with a low confidence, in which case the geometrically calculated angle is used.

Throughout this application, embodiments are discussed having two cameras. Embodiments that use target object information from three or more cameras are also contemplated.

Exemplary Mobile Device

Figure 7:
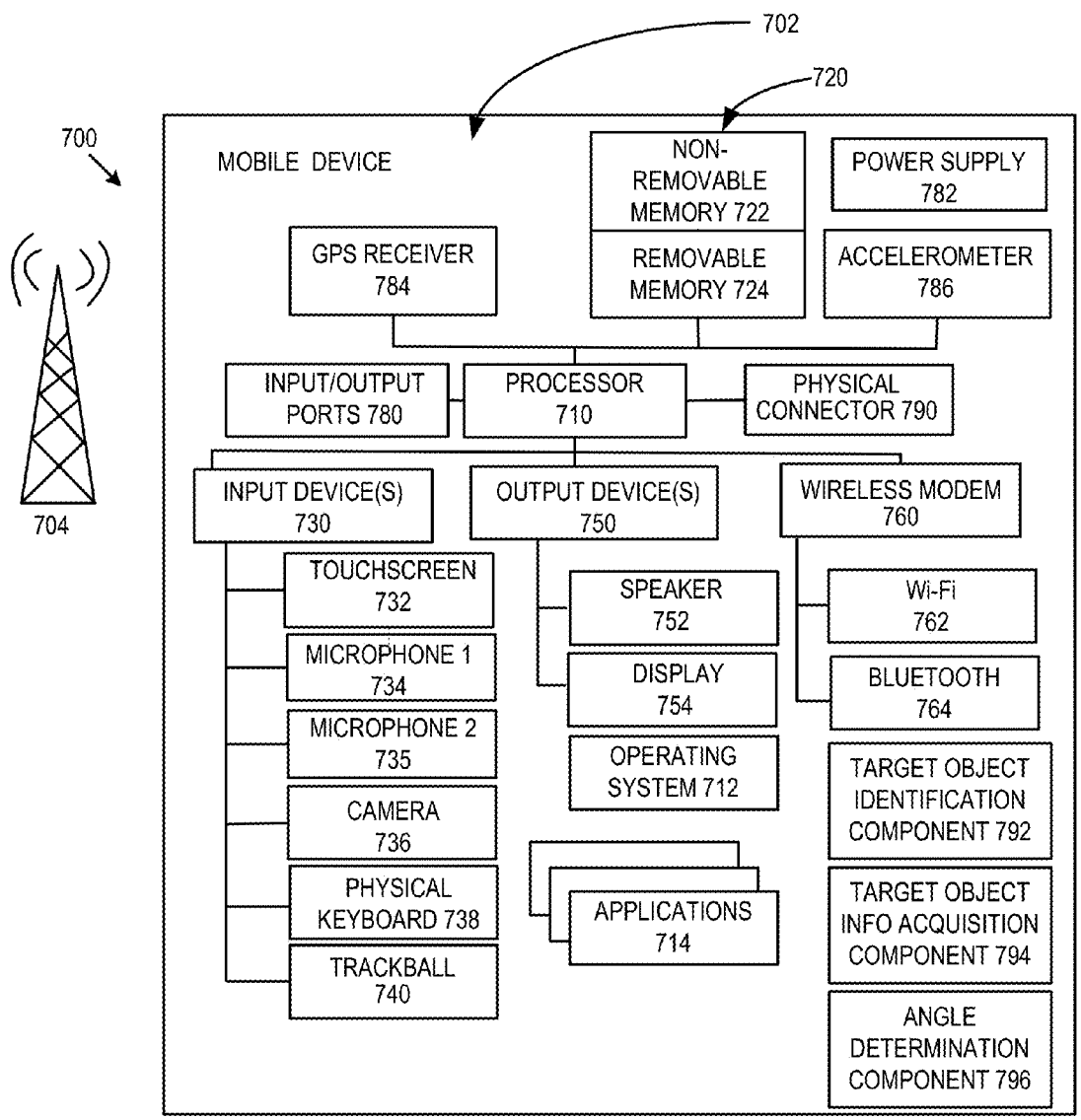
FIG. 7 is a diagram of an exemplary mobile phone having target object identification capabilities in which some described embodiments can be implemented.

FIG. 7 is a system diagram depicting an exemplary mobile device 700 including a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 704, such as a cellular or satellite network.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components 702 and support for one or more applications 714. The application programs can include common mobile computing applications (e.g., email applications, calendars, contact managers, web browsers, messaging applications), or any other computing application.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touchscreen 732, microphone 734, camera 736, physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touchscreen with user-resizable icons 732 and display 754 can be combined in a single input/output device. The input devices 730 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 can comprise speech-recognition software as part of a voice user interface that allows a user to operate the device 700 via voice commands. Further, the device 700 can comprise input devices and software that allows for user interaction via a user's spatial gestures, such as detecting and interpreting gestures to provide input to a gaming application.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth or Wi-Fi). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port.

Mobile device 700 can also include target object identification component 792, target object information acquisition component 794, and angle determination component 796, which can be implemented as part of applications 714. The illustrated components 702 are not required or all-inclusive, as any components can deleted and other components can be added.

Exemplary Operating Environment

Figure 8:
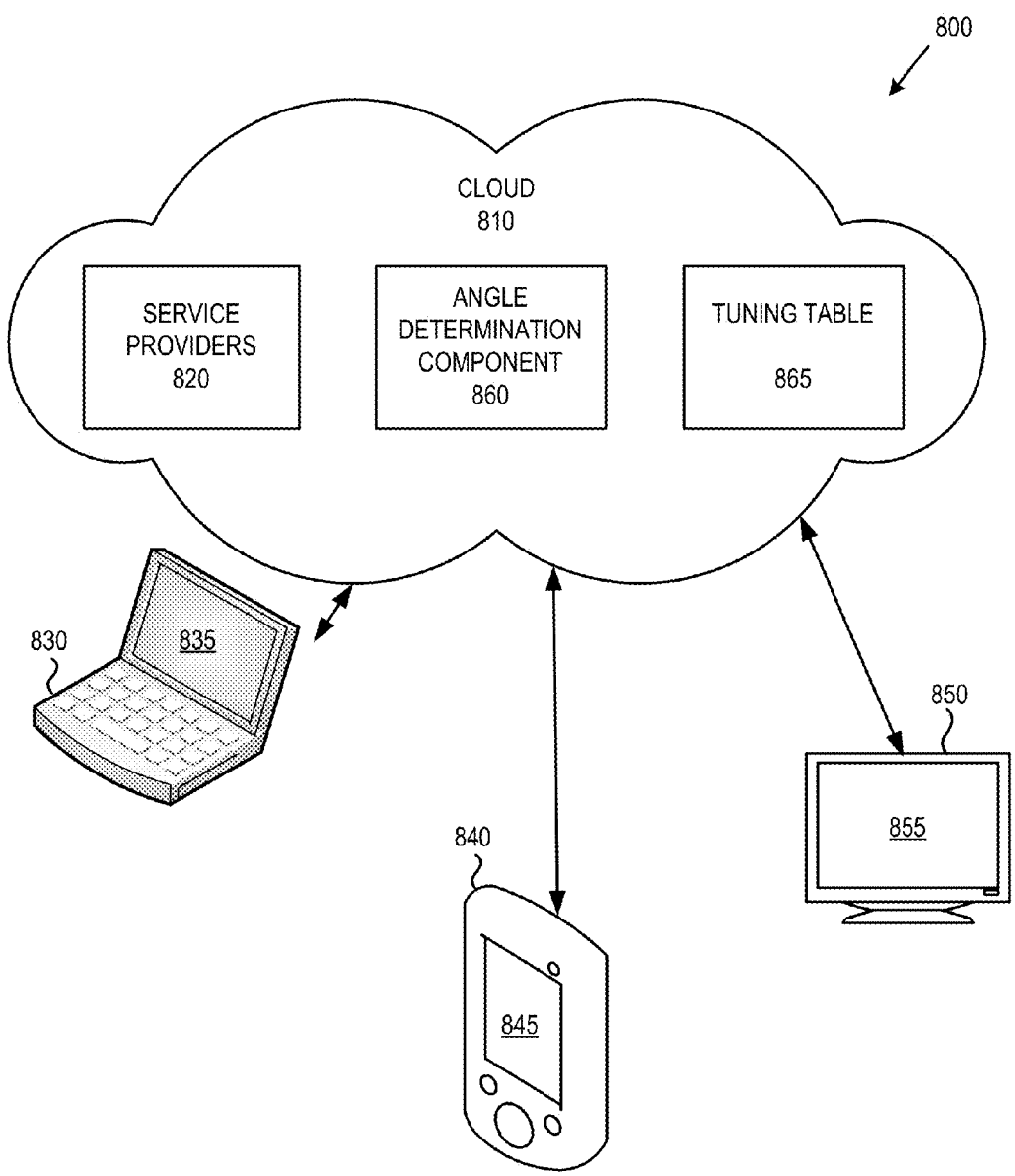
FIG. 8 is a diagram illustrating a generalized example of a suitable implementation environment for any of the disclosed embodiments.

FIG. 8 illustrates a generalized example of a suitable implementation environment 800 in which described embodiments, techniques, and technologies may be implemented.

In example environment 800, various types of services (e.g., computing services) are provided by a cloud 810. For example, the cloud 810 can comprise a collection of computing devices, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices 830, 840, 850) while other tasks (e.g., storage of data to be used in subsequent processing) can be performed in the cloud 810.

In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, or the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touchscreen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

In some embodiments, angle determination component 860 and tuning table 865 are stored in the cloud 810. Target object information can be streamed to cloud 810, and angle determination component 860 can determine the angle, in some cases using tuning table 865, in cloud 810. In such an embodiment, potentially resource-intensive computing can be performed in cloud 810 rather than consuming the power and computing resources of connected device 840. Other functions can also be performed in cloud 810 to conserve resources. In some embodiments, tuning table 865 can be dynamically updated in the cloud. Updates may occur, for example, through additional empirical observation or user feedback.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionally described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

We claim:

1. At least one non-volatile computer memory storing computer-executable instructions for determining an angle of a target object with respect to a device, the determining the angle comprising:
    receiving a first image captured using a first camera on the device and a second image captured using a second camera on the device, wherein the first camera is spaced a distance apart from the second camera on the device, and wherein the first and second images are captured at approximately a same capture time;
    determining a correlation value for a correlation between the first and second images;
    accessing a tuning table having image-to-image correlation values and corresponding angles; and
    retrieving the angle corresponding to the image-to-image correlation value closest to the determined correlation value.

2. The non-volatile computer memory of claim 1, wherein the determining the angle further comprises:
    receiving a first estimated distance from the target object to the first camera;
    receiving a second estimated distance from the target object to the second camera; and
    geometrically calculating the angle of the target object with respect to the device based on the first and second estimated distances.

3. The non-volatile computer memory of claim 2, wherein the first and second estimated distances are acquired using an autofocus function of the first and second cameras, respectively.

4. The non-volatile computer memory of claim 1, wherein the angle between the target object and the device is an angle between a first reference line extending from the target object to the device and a second reference line extending through the device, wherein the second reference line is substantially perpendicular to a third reference line extending between the first and second cameras, and wherein the first reference line and the second reference line intersect at the approximate midpoint of the third reference line.

5. The non-volatile computer memory of claim 1, wherein the determining the angle further comprises:
    receiving a user selection of a first object visible on a display of the device; and
    identifying the first object as the target object in response to the user selection of the first object.

6. The non-volatile computer memory of claim 5, wherein the determining the angle further comprises:
    receiving a user selection of a second object visible on the display of the device; and
    updating the target object from the first object to the second object in response to the user selection of the second object.

7. The non-volatile computer memory of claim 1, wherein the determining the angle further comprises:
    receiving user selections of a plurality of objects visible on a display of the device; and
    identifying the plurality of objects as the target object in response to the user selections.

8. The non-volatile computer memory of claim 7, wherein the determining the angle further comprises:
    determining an angle for each of the plurality of objects; and
    determining a representative angle for the target object based on the angles determined for the plurality of objects.

9. The non-volatile computer memory of claim 1, wherein the determining the angle further comprises providing the determined angle to a microphone audio source separation algorithm.

10. The non-volatile computer memory of claim 1, wherein the device is a mobile phone.

11. The non-volatile computer memory of claim 1, wherein the capture time is a first time, and further comprising:
    receiving additional images captured at approximately a second time using the first camera and second camera; and
    tracking the target object by determining an updated angle between the target object and the device based on the additional images.

12. A multi-camera mobile device having target object angle determination capabilities, the mobile device comprising:
    a first camera;
    a second camera;
    a touchscreen display;
    a target object identification component configured to identify an object visible on the touchscreen display of the device as the target object;
    a target object information acquisition component configured to receive a first image captured by the first camera and a second image captured by the second camera, the first image and the second image captured approximately simultaneously by the first and second cameras, respectively; and
    an angle determination component configured to determine an angle between the target object and the device using the received first and second images, the angle determination component comprising a correlation component configured to determine a correlation value for a correlation between the first and second images and determine the angle by accessing a tuning table having image-to-image correlation values and corresponding angles and retrieving the angle corresponding to the image-to-image correlation value closest to the determined correlation value.

13. The mobile device of claim 12, wherein the angle determination component further comprises:
    a geometric calculation component configured to, upon receipt of estimated distances from the target object to the corresponding camera on the device acquired using an autofocus function, determine the angle through geometric calculation.

14. The mobile device of claim 12, wherein the target object identification component is configured to identify the target object based on at least one of user selection of the target object from the touchscreen display of the device or the target object being located in a specified section of the touchscreen display.

15. A method of determining an angle of a target object with respect to a device, the method comprising:
    receiving an identification of an object visible on a display of the device as the target object;
    receiving a pair of images including at least a portion of the target object, the pair of images comprising a first image captured by a first camera on the device and a second image captured by a second camera on the device;
    determining a correlation value for a correlation between the first and second images; and
    determining an angle between a first reference line extending from the target object to the device and a second reference line extending through the device by:
        accessing a tuning table having correlation values and corresponding angles; and
        retrieving the angle corresponding to the correlation value closest to the determined correlation value.

16. The method of claim 15, wherein the target object is identified by at least one of user selection of the target object from the device display or the target object being located in a specified section of the display.

17. The method of claim 15, further comprising providing the retrieved angle to a microphone audio source separation algorithm.

18. The mobile device of claim 12, wherein the angle between the target object and the mobile device is an angle between a first reference line extending from the target object to the mobile device and a second reference line extending through the mobile device, wherein the second reference line is substantially perpendicular to a third reference line extending between the first and second cameras, and wherein the first reference line and the second reference line intersect at the midpoint of the third reference line.

19. The mobile device of claim 12, wherein the angle is provided to a microphone audio source separation algorithm.

20. The mobile device of claim 12, wherein the correlation values in the tuning table are empirically determined.

* * * * *